(12) United States Patent (10) Patent No.: US 12,581,307 B2

Monshizadeh et al. (45) Date of Patent: Mar. 17, 2026

---

(54) SECURITY IN COMMUNICATION NETWORKS

(71) Applicant: Nokia Solutions and Networks Oy, Espoo (FI)

(72) Inventors: Mehrnoosh Monshizadeh, Saint Germain les Arpajon (FR); Vikramajeet Khatri, Espoo (FI); Marah Gamdou, Longjumeau (FR)

(73) Assignee: Nokia Solutions and Networks Oy, Espoo (FI)

( * ) Notice: Subject to any disclaimer, the term of this patent is extended or adjusted under 35 U.S.C. 154(b) by 416 days.

(21) Appl. No.: 17/716,006

(22) Filed: Apr. 8, 2022

(65) Prior Publication Data

US 2023/0328528 A1 Oct. 12, 2023

(51) Int. Cl.
H04W 12/122 (2021.01)

(52) U.S. Cl.
CPC ................................. H04W 12/122 (2021.01)

(58) Field of Classification Search
CPC .................................................. H04W 12/122
See application file for complete search history.

(56) References Cited

U.S. PATENT DOCUMENTS

| | | | | |
|---|---|---|---|---|
| 11,115,823 | B1 * | 9/2021 | Heiland | ................... G06F 18/24 |
| 2019/0132343 | A1 | 5/2019 | Chen et al. | |

| | | | | |
|---|---|---|---|---|
| 2019/0180115 | A1 * | 6/2019 | Zou | ...................... G06V 20/588 |
| 2019/0228316 | A1 | 7/2019 | Felsen et al. | |
| 2020/0233920 | A1 | 7/2020 | Meeds et al. | |
| 2020/0372339 | A1 | 11/2020 | Che et al. | |
| 2021/0409433 | A1 * | 12/2021 | Pallagatti Kotrabasappa | .............. H04L 63/0263 |
| 2021/0409439 | A1 * | 12/2021 | Engelberg | ........... H04L 63/1416 |
| 2022/0188690 | A1 * | 6/2022 | Rawat | .................... G06V 10/82 |

OTHER PUBLICATIONS

A. Singla, E. Bertino and D. Verma, "Overcoming the Lack of Labeled Data: Training Intrusion Detection Models Using Transfer Learning," 2019 IEEE International Conference on Smart Computing (Smartcomp), Washington, DC, USA, 2019, pp. 69-74, (Year: 2019).*

A. Jaiswal, A. S. Manjunatha, B. R. Madhu and M. P. Chidananda, "Predicting unlabeled traffic for intrusion detection using semi-supervised machine learning," (Year: 2016).*

Lopez-Martin, M.; Carro, B.; Sanchez-Esguevillas, A.; Lloret, J. Conditional Variational Autoencoder for Prediction and Feature Recovery Applied to Intrusion Detection in IoT. Sensors 2017, 17, 1967 (Year: 2017).*

(Continued)

*Primary Examiner* — Sangseok Park

(74) *Attorney, Agent, or Firm* — Laine IP Oy

(57) ABSTRACT

According to an example aspect of the present disclosure, there is provided a method, comprising, receiving input data comprising data points, applying a conditional variational autoencoder to the received data points to generate features associated with the received data points, wherein said applying the conditional variational autoencoder comprises using a label corresponding to a type of network traffic as a conditional variable of the conditional variational autoencoder, applying a classifier to the features to classify the received data points into categories and performing at least one action based on the categories.

19 Claims, 7 Drawing Sheets

(56) References Cited

OTHER PUBLICATIONS

Doucette, Jonathan, Christian Kames, and Alexander Rauscher. "Metropolis-CVAE: Bootstrapping Labels for Bayesian Inference via Semi-Supervised Conditional Variational Autoencoders." (Year: 2021).*

Bedi et al: I-SiamIDS: An improved Siam-IDS for handling class imbalance in network-based intrusion detection systems. Applied Intelligence, 2020.

IEEE: Anomaly Detection with Conditional Variational Autoencoders. 2019 18th IEEE International Conference On Machine Learning And Applications (ICMLA), Dec. 16-19, 2019.

IEEE: Toward Effective Intrusion Detection Using Log-Cosh Conditional Variational Autoencoder. IEEE Internet of Things Journal, vol. 8, Issue: 8, Apr. 15, 2021. https://ieeexplore.ieee.org/document/9244068.

Sun et al: Learning Sparse Representation With Variational Auto-Encoder for Anomaly Detection. IEEE Access, 2018, vol. 6, pp. 33353-33361.

Wang et al: adVAE: a Self-adversarial Variational Autoencoder with Gaussian Anomaly Prior Knowledge for Anomaly Detection. Knowledge-Based Systems, 2020, vol. 190, p. 105187.

Wei et al: Insider Threat Detection Using multiautoencoder Filtering and Unsupervised Learning. Advances in Digital Forensics XVI, Springer International Publishing, 2020, pp. 273-290.

Yang et al: Improving the Classification Effectiveness of Intrusion Detection by Using Improved Conditional Variational AutoEncoder and Deep Neural Network. Sensors, 2019, vol. 19, p. 2528.

Yang et al: Network Intrusion Detection Based on Supervised Adversarial Variational Auto-Encoder With Regularization. IEEE Access, 2020, vol. 8, pp. 42169-42184.

Yousefi-Azar et al: Autoencoder-based Feature Learning for Cyber Security Applications. 2017 International Joint Conference on Neural Networks (IJCNN), 2017, pp. 3854-3861.

* cited by examiner

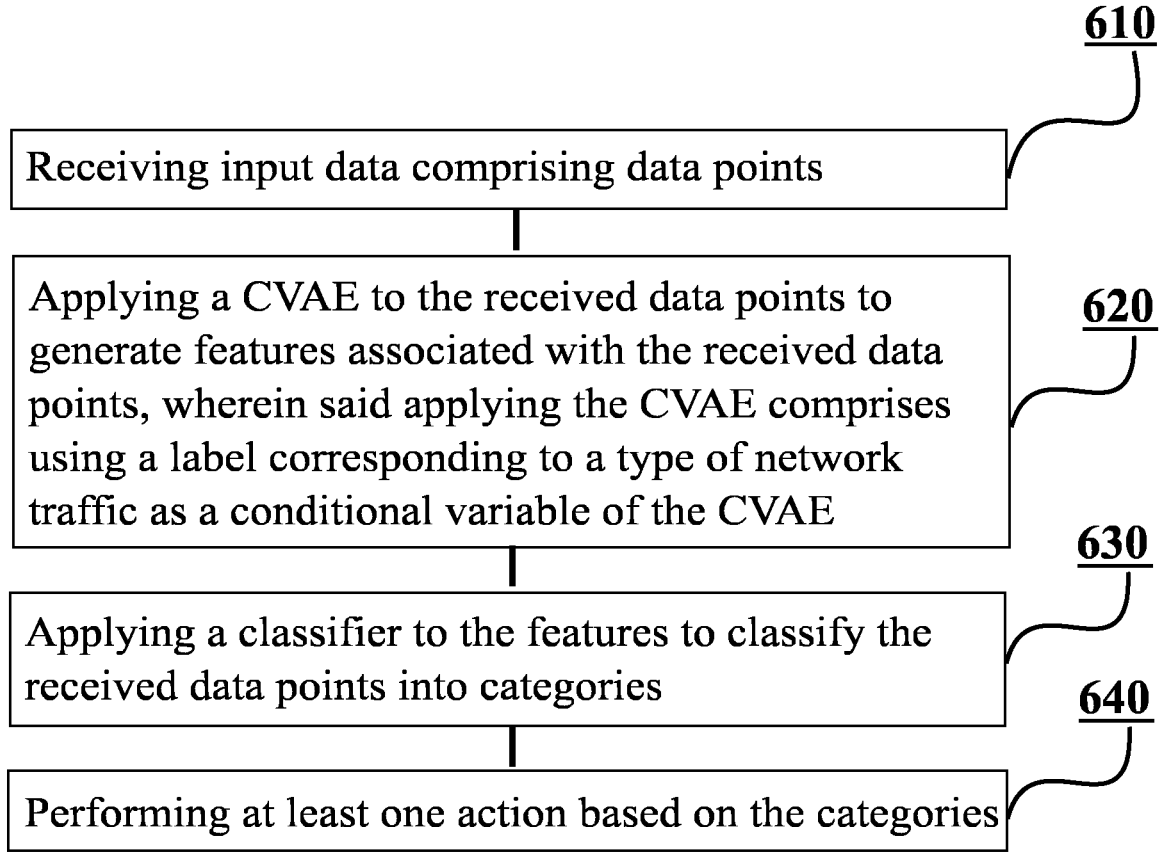

610

Receiving input data comprising data points

620

Applying a CVAE to the received data points to generate features associated with the received data points, wherein said applying the CVAE comprises using a label corresponding to a type of network traffic as a conditional variable of the CVAE

630

Applying a classifier to the features to classify the received data points into categories

640

Performing at least one action based on the categories

FIGURE 6

SECURITY IN COMMUNICATION NETWORKS

FIELD

Various example embodiments relate in general to communication networks and more specifically, to security in such systems.

BACKGROUND

Security is important in various communications in general, such as in cellular communication systems, like in 5G networks developed by the 3rd Generation Partnership Project, 3GPP. The 3GPP still develops 5G networks and there is a need to provide improved methods, apparatuses and computer programs for enhancing security of 5G networks. Such enhancements may be exploited in other cellular communication networks as well. For example, such enhancements may be exploited in 6G networks in the future.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising at least one processor; and at least one memory including computer program code; the at least one memory and the computer program code configured to, with the at least one processor, cause the apparatus at least to receive input data comprising data points, apply a conditional variational autoencoder to the received data points to generate features associated with the received data points, wherein said applying the conditional variational autoencoder comprises using a label corresponding to a type of network traffic as a conditional variable of the conditional variational autoencoder, apply a classifier to the features to classify the received data points into categories and perform at least one action based on the categories.

Embodiments of the first aspect may comprise at least one feature from the following bulleted list or any combination of the following features:

wherein the categories comprise normal, unknown and at least one attack category;

wherein the apparatus is further configured to train the conditional variational autoencoder with unlabelled data;

wherein the apparatus is further configured to train the classifier with labelled data;

wherein an encoder of the conditional variational autoencoder is used after training and a decoder of the conditional variational autoencoder is used during training of the conditional variational autoencoder and the classifier;

wherein the classifier is a random forest classifier;

wherein the apparatus is further configured to apply an output of the classifier to a clustering analysis method;

wherein the clustering analysis method is Density-Based Spatial Clustering of Applications with Noise, DBSCAN, method;

wherein the apparatus is further configured to operate as an intrusion detection system.

According to a second aspect, there is provided a method comprising, receiving input data comprising data points, applying a conditional variational autoencoder to the received data points to generate features associated with the received data points, wherein said applying the conditional variational autoencoder comprises using a label corresponding to a type of network traffic as a conditional variable of the conditional variational autoencoder, applying a classifier to the features to classify the received data points into categories and performing at least one action based on the categories.

Embodiments of the second aspect may comprise at least one feature from the following bulleted list or any combination of the following features:

wherein the categories comprise normal, unknown and at least one attack category;

wherein the method further comprises training the conditional variational autoencoder with unlabelled data;

wherein the method further comprises training the classifier with labelled data.

wherein an encoder of the conditional variational autoencoder is used after training and a decoder of the conditional variational autoencoder is used during training of the conditional variational autoencoder and the classifier;

wherein the classifier is a random forest classifier;

wherein the method further comprises applying an output of the classifier to a clustering analysis method;

wherein the clustering analysis method is Density-Based Spatial Clustering of Applications with Noise, DBSCAN, method;

wherein the method further comprises operating as an intrusion detection system.

According to a third aspect of the present disclosure, there is provided an apparatus comprising means for performing the method of the second aspect.

According to a fourth aspect of the present disclosure, there is provided a non-transitory computer readable medium having stored thereon a set of computer readable instructions that, when executed by at least one processor, cause an apparatus to at least perform the method of the second aspect. According to a fifth aspect of the present disclosure, there is provided a computer program comprising instructions which, when the program is executed by an apparatus, cause the apparatus to carry out the method of the second aspect.

BRIEF DESCRIPTION OF THE DRAWINGS

FIG. 6 illustrates a flow graph of a method in accordance with at least some example embodiments;

EMBODIMENTS

Embodiments of the present disclosure provide security enhancements for communication networks. More specifically, embodiments of the present disclosure enhance security of communication networks by utilizing a Conditional Variational AutoEncoder, CVAE, together with a classifier, such as Random Forest, RF, classifier.

Figure 1:
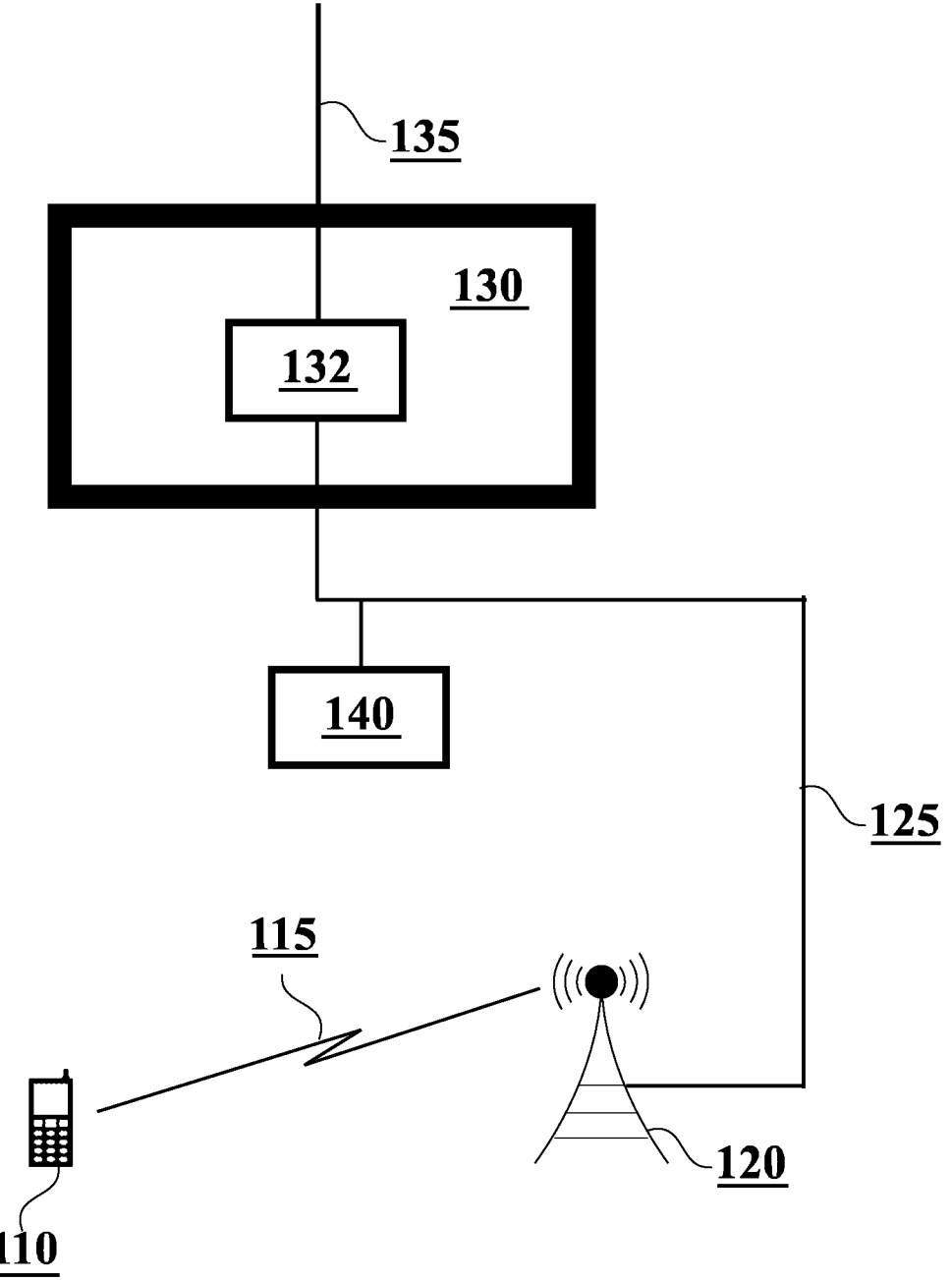
FIG. 1 illustrates a network scenario in accordance with at least some example embodiments.

FIG. 1 illustrates an exemplary network scenario in accordance with at least some example embodiments. According to the example scenario of FIG. 1, there may be a communication network, which comprises wireless terminal 110, wireless network node 120, and core network 130. Core network 130 may further comprise apparatus 132, like an intrusion detection apparatus. In some example embodiments, apparatus 132 may not be in core network 130 though. Apparatus 132 may be a part of wireless network node 120, or located between wireless network node 120 and core network 130.

In some embodiments, apparatus 132 may be outside of the communication network shown in FIG. 1. That is, embodiments of the present disclosure may be exploited in other communication systems as well and the cellular communication network is merely used as an example. The communication network may also comprise another apparatus 140, like an intruder. Another apparatus 140 may transmit packets in, or to, the communication network. The packets may comprise unknown traffic and apparatus 132 may further analyze said packets upon reception.

Wireless terminal 110 may comprise, for example, User Equipment, UE, a smartphone, a cellular phone, a Machine-to-Machine, M2M, node, Machine-Type Communications node, MTC, an Internet of Things, IoT, node, a car telemetry unit, a laptop computer, a tablet computer or, indeed, any suitable wireless terminal. In the example of FIG. 1, wireless terminal 110 may communicate wirelessly with wireless network node 120, or with a cell of wireless network node 120, via air interface 115.

Wireless terminal 110 may be connected to wireless network node 120 via air interface 115. Air interface 115 between wireless terminal 110 and wireless network node 120 may be configured in accordance with a Radio Access Technology, RAT, which wireless terminal 110 and wireless network node 120 are configured to support.

Examples of cellular RATs comprise Long Term Evolution, LTE, New Radio, NR, which may also be known as fifth generation, 5G, radio access technology and MulteFire. In case of cellular RATs, wireless terminal 110 may be referred to as a UE and wireless network node 120 may be referred to as a Base Station, BS. For example, in the context of LTE, wireless network node 120 may be referred to as eNB while in the context of NR, wireless network node 120 may be referred to as gNB. Examples of non-cellular RATs comprise Wireless Local Area Network, WLAN, and Worldwide Interoperability for Microwave Access, WiMAX. In case of non-cellular RATs, wireless terminal 110 may be referred to as a wireless client and wireless network node 120 may be referred to as a an access point.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network.

Adversarial attacks on, e.g., Artificial Intelligence, AI, systems may be, or become, a major security concern for various communication networks, such as cellular communication networks, like 5G networks or 6G networks in the future. Moving toward an intelligent network may require utilizing AI as an essential component in the architecture, products, and services. However, in such intelligent networks, AI may not be only an enabler, but AI may be employed by attackers as offender to launch intelligent attacks, e.g., using anomalous data points. AI-driven attacks may operate at scale and become stealthier. Due to the adaptable structure of AI systems, it may be possible to switch between attack techniques and easily bypass defence mechanism(s). Hence, mitigating these attacks requires more intelligent defence systems empowered by AI methods that in real time and with minimum human interaction detect the malicious input.

For example, in the field of machine learning, feature selection is one of the challenges. It may be desirable to solve issues related to feature selection in particular in overfitting contexts, because in case of overfitting context the feature selection may have disastrous effects on anomaly detection performance.

Techniques like Principal Component Analysis, PCA, or autoencoders may be used to automate feature selection in an unsupervised manner, e.g., for linear and non-linear data representations, respectively. However, drawbacks are also associated with the use of these techniques since PCA linear representations may poorly represent data in most cases, at least without further improvements, while latent spaces derived in an autoencoder may lack required regularities for model generalization.

In some example embodiments of the present disclosure, the dual structure of Variational AutoEncoders, VAE, may be used to provide good results on data compression and/or reconstruction. Furthermore, efficiency of VAE techniques may be improved by data labelling adaptation, in their conditional version, CVAE. These techniques may be exploited to mitigate overfitting and for data model generalization.

More specifically, example embodiments of the present disclosure enable generalizing and assessing autoencoders' properties, which would be beneficial for example in cyber-security applications, wherein the false alarm rates, detection probabilities, and classification error guaranties may be a challenge, at least when using machine learning or deep learning tools. Without labelled datasets, feature selection methods may suffer from data generalization which may considerably degrade the accuracy. Moreover, manual techniques, such as cross-validation, that may solve the overfitting problem to some extent, may not be efficient enough, e.g., for real-time intrusion detection. The deep generative models, such as the CVAE, may be used to provide a feature representation by estimating latent space of data. Such models are becoming popular in the different domains such as image processing, but those hardly ever appear in the cybersecurity area.

Example embodiments of the present disclosure therefore solve the above mentioned challenges by providing a combined architecture, comprising a CVAE and a classifier, like an RF classifier. The CVAE may be exploited to automatically learn similarity among input features and provide data distribution in order to extract discriminative features from original features. Finally, the classifier may be used to classify incoming packets into various types of attacks. In particular, the RF classifier may be used for efficient classification. The CVAE may be used to introduce labels of traffic packets, i.e., input data comprising data points, into a latent space in order to better learn the changes of input samples and distinguish data characteristics of each class, thereby avoiding confusion between classes while learning the whole data distribution. These may be features of input traffic and/or samples, which may help to distinguish between nature and/or class of traffic, i.e., whether it is attack, normal or unknown. Some examples of features include Internet Protocol, IP, address, Medium Access Control, MAC, address, Time-To-Live, TTL, packet length, etc.

Embodiments of the present disclosure achieve an effective representation and reduce dimensionality, and provide high detection rates. Also, the overfitting issue can be solved.

Figure 2:
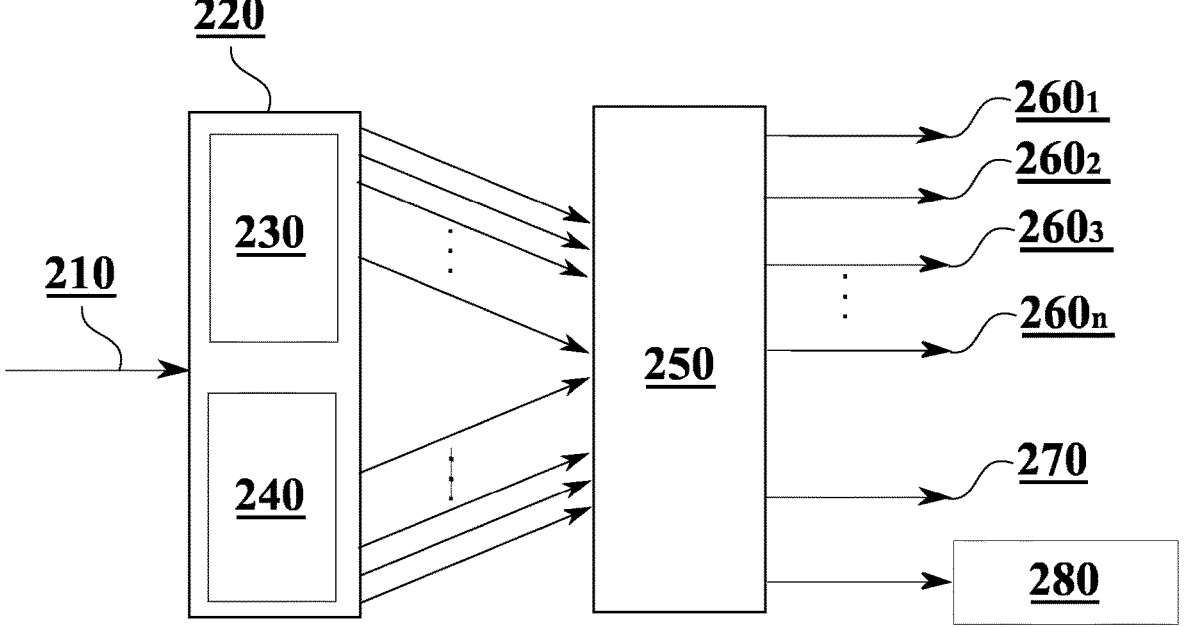
FIG. 2 illustrates a general architecture in accordance with at least some example embodiments.

FIG. 2 illustrates a general architecture in accordance with at least some example embodiments. In FIG. 2, input data is denoted by 210. Input data 210 may comprise data points. In some embodiments, input data 210 may be an input packet. Feature selection/extraction is denoted by 220. Feature selection/extraction may comprise Support Vector Machine online, SVMo, 230 and/or CVAE 240. SVMo, 230 and/or CVAE 240 may extract the best features from input data 210 and provide these features to classifier 250, such as a classifier algorithm, like an RF classifier algorithm, in order to classify data into different categories, e.g., normal, unknown and attack categories.

Different attack categories are denoted by $260_1$-$260_N$ while a benign, like a normal, category is denoted by 270. Different attack categories may comprise for example Denial of Service, DoS, Distributed Denial of Service, DDoS, Backdoor, Domain Name Server, DNS, Ping flood, Sync flood, Brute force, etc. In some example embodiments, data categorized by classifier 250 may be applied to clustering analysis method 280, like Density-Based Spatial Clustering of Applications with Noise, DBSCAN, Ordering Points to Identify the Clustering Structure, OPTICS, or Shared Nearest Neighbor, SNN. Clustering analysis method 280 may be referred to as a density-based clustering algorithm as well.

At least one action may be performed based on the categories of the data points. For instance, the output of the density-based clustering algorithm may be provided in a table that depicts the number of packets in each cluster distributed according to various attack types. The clusters that contain less than a threshold packets may be discarded. For the rest of the clusters and for decreasing requirements on computation resources, the packet numbers may be converted to percentage (of total number). For example, if a cluster contains 1000 packets in which 100 packets are of type 1, and 300 packets of type 2, these numbers may be converted to 10% T1 and 30% T2. With a voting mechanism, like a Generalized Boyer-Moore Majority Vote Algorithm, only types with high percentage may be analyzed further.

An attack type for a data point representing a network packet can be determined based on definitions on the following attributes of network packets, wherein the definitions may be provided as predetermined values and value ranges, or provided in more generalized form as an executable script: Packet size, origin of the packets and/or time stamp in relation to location of generated packets.

The use of a density-based clustering algorithm, like DBSCAN, makes it possible to find clusters in any shape, as long as the elements, i.e., data points, are density connected. For instance, points p and q may be density connected if there exists a point r which has sufficient number of points in its neighbours and both points p and q are within epsilon (c) distance. This is important at least when dealing with a clustering problem of unknown incoming data, like unknown protocol messages or anomalous data points, because the shape of clusters may be uncertain. The density-based clustering algorithm further enables automation of the process with a minimum human interaction, thereby enabling real-time analysis.

If the number of clusters would need to be defined in advance for multi clustering, it would make real time analysis impossible. As there may be unknown traffic, the number of clusters cannot be defined in advance. In some embodiments, the multi clustering may be used once in a training process and later on the density-based clustering algorithm, like DBSCAN, may be exploited to define the cluster numbers automatically. Hence, automation is enabled, which is necessary for real-time analysis, but also the performance is improved by making manual cluster definition and model tuning unnecessary.

Embodiments of the present disclosure may be exploited to achieve a good silhouette score regardless of nature of the applied dataset, i.e., the incoming data, and overall, an efficient solution is provided that in real-time clusters unknown, anomalous traffic with several characteristics.

Figure 3:
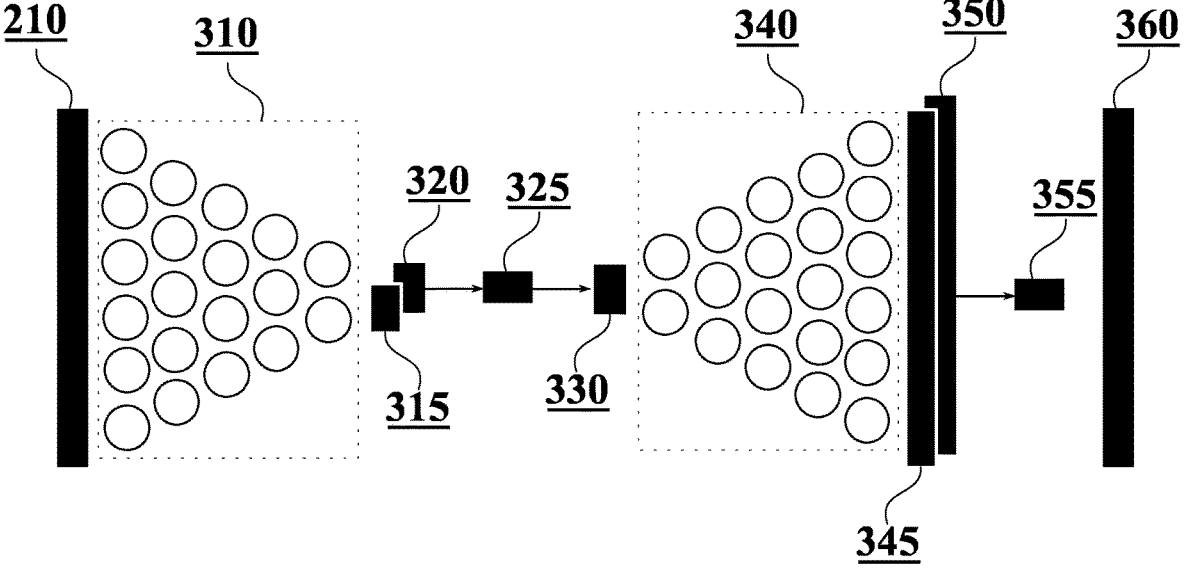
FIG. 3 illustrates a variational autoencoder in accordance with at least some example embodiments.

FIG. 3 illustrates a variational autoencoder in accordance with at least some example embodiments. Again, input data is denoted by 210 while an encoder (encoder network), like a probabilistic encoder q(z|x; φ), is denoted by 310, $\mu_\varphi(x)$ is denoted by 315 and $v_\varphi(x)$ is denoted by 320. Moreover, sampling operation is denoted by 325, sampled latent vector $\bar{z}$ by 330, a decoder (decoder network), like a probabilistic decoder p(z|x; θ) by 340, $v_\theta(\bar{z})$ by 345, $\mu_\theta(\bar{z})$ by 350, sampling by 355 and reconstructed output $\hat{x}$ by 360.

In some example embodiments, $v_\varphi(x)$ 320 may be the mean of the gaussian distribution (the distribution from which the latent variable (or encoding) may be sampled), $\mu_\varphi(x)$ 315 may be the variance of the same gaussian distribution, sampled latent vector $\bar{z}$ 330 may be the latent variable or the encoding which is sampled from the gaussian distribution learned by encoder 310, $\mu_\theta(\bar{z})$ 350 may be the mean of the distribution learned by decoder 340, $v_\theta(\bar{z})$ 345 may be the variance of this latter distribution, sampling 355 may be the sampling operation (as we have a distribution for the generation (or decoding) and we want only one sample as an output), reconstructed output $\hat{x}$ 360 may be a generated packet (which may be a reconstruction of the input packet with variations).

Figure 4:
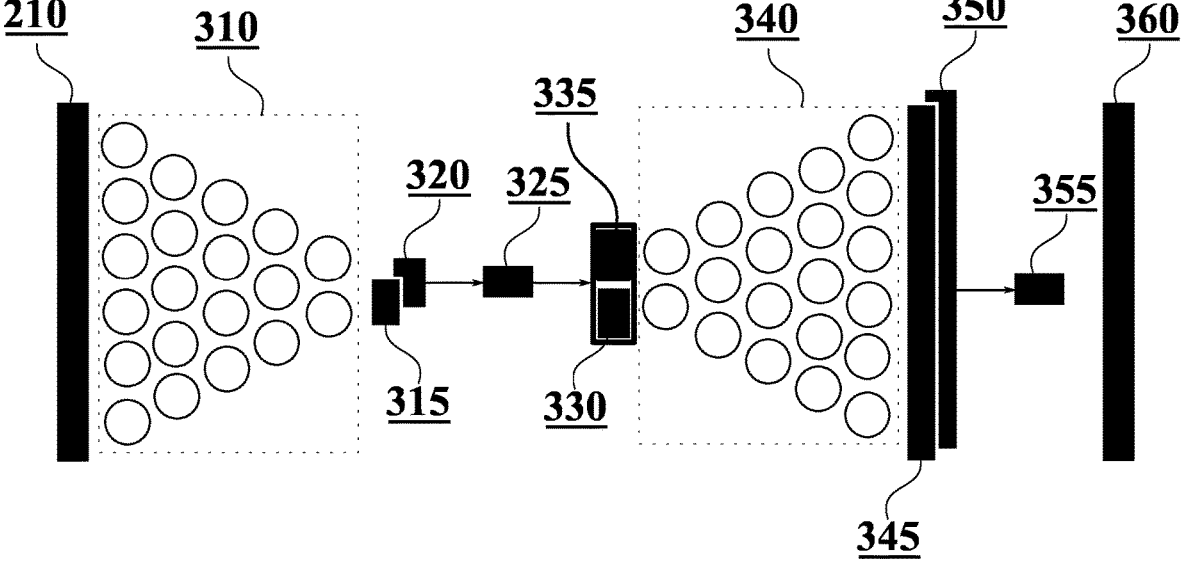
FIG. 4 illustrates a conditional variational autoencoder in accordance with at least some example embodiments.

FIG. 4 illustrates a conditional variational autoencoder in accordance with at least some example embodiments. The conditional variational autoencoder corresponds to the variational autoencoder of FIG. 3 otherwise, but the conditional variational autoencoder further comprises label y, denoted by 335. In the conditional variational autoencoder of FIG. 4, decoder 340 may take label y as an additional input in order to generate a sample that belongs to a class indicated by the label. That is, label y may be concatenated with latent vector z. Therefore, instead of having p(z|x; θ) as the likelihood that is parametrized by decoder 340, the likelihood may be p(z|x; θ; y), wherein is a conditional probability depends on input label y. That is, instead of using only a latent variable (or encoding with label y 335), concatenation may be with a label of input packet 330, which may be a one-hot vector.

In general, the CVAE may be used for optimizing an algorithm for different purposes, e.g., for generating attack samples. The conditional (optimization) VAE helps to make classes of input data more distinguishable as it may force the VAE to take class labels into account in latent space.

In some example embodiments, there may be a combined architecture comprising a VAE or a CVAE, and a classifier, wherein the VAE or the CVAE, respectively, receives input data and provides its output to the classifier.

In some example embodiments, the VAE or the CVAE may learn similarity among input features.

In some example embodiments, the VAE or the CVAE may provide dimensionality reduction to the input data.

In some example embodiments, the VAE or the CVAE may be initially trained with unlabelled data and automatically perform labelling of the input data, such as network traffic packets, wherein the label may correspond to a type of network traffic. The VAE or CVAE may be trained only once (or very less frequently) with entire labelled data set for extracting features. The classifier, such as the RF classifier, may be trained more frequently with entire labelled data.

In some example embodiments, the CVAE may use the label y corresponding to the type of network traffic as the conditional variable of CVAE, helping to make classes of traffic more distinguishable and thus solving the overfitting problem common to variational autoencoders.

In some example embodiments, the VAE or the CVAE may avoid the confusion between classes while learning the whole data distribution.

In some example embodiments, the VAE or the CVAE may extract most discriminative features and provide them to the classifier.

In some example embodiments, the encoder of the VAE or the CVAE may be used after training, and the decoder of the VAE or the CVAE may only be used during the training of the VAE or the CVAE and the classifier.

In some example embodiments, the use of a VAE or a CVAE decoder may have a beneficial effect in improving the training of the VAE or the CVAE, and the classifier on rarely-occurring features.

In some example embodiments, the classifier may be initially trained with labelled data, wherein the labels may be the classes intended to be used by the classifier for network traffic.

In some example embodiments, the network traffic may be classified into at least the following classes: normal traffic or an attack.

In some example embodiments the network traffic may be classified into the following classes: normal traffic, unknown traffic, or various types of attacks.

In some example embodiments, the classifier may be a RF classifier due to its short processing time, flexibility and ease of use of its results.

In some example embodiments, an effective and reliable representation is achieved by using the RF classifier together with the following classes: normal traffic, unknown traffic, or various types of attacks.

In general, example embodiments of the present disclosure may be used to achieve detection rates mostly above 99.9% overall and per attack class, thereby solving the overfitting problem efficiently. The efficiency per packet may be evaluated based on uniform metrics including computation time, precision, recall, F1-score, Area Under Curve, AUC, log loss, and Receiver Operator Characteristics, ROC, curves.

In some example embodiments, the reliability of the architecture may be evaluated against datasets containing different types of attacks.

In some example embodiments, the output of the classifier may be used as input to a clustering analysis method, i.e., to a clustering algorithm.

In some example embodiments, the feature selection and optionally clustering analysis may be performed by an intrusion detection system.

In some example embodiments, the CVAE may be trained with unlabelled data. For training, the process steps may comprise training the CVAE with unlabelled data (input data provided to CVAE is not labelled), using the trained CVAE to encode the training data of the RF classifier and training the RF classifier using the encoded training data. For testing, the process steps may comprise taking test data and encoding it using the trained CVAE and classifying the encoded test data using the trained RF. In some example embodiments, the entire data may be given to the CVAE (once trained) for the testing process, and the result of the CVAE (which may be extracted features in coded format) may be given together with entire labelled data to the classifier for further classification, e.g., attacks.

Figure 5:
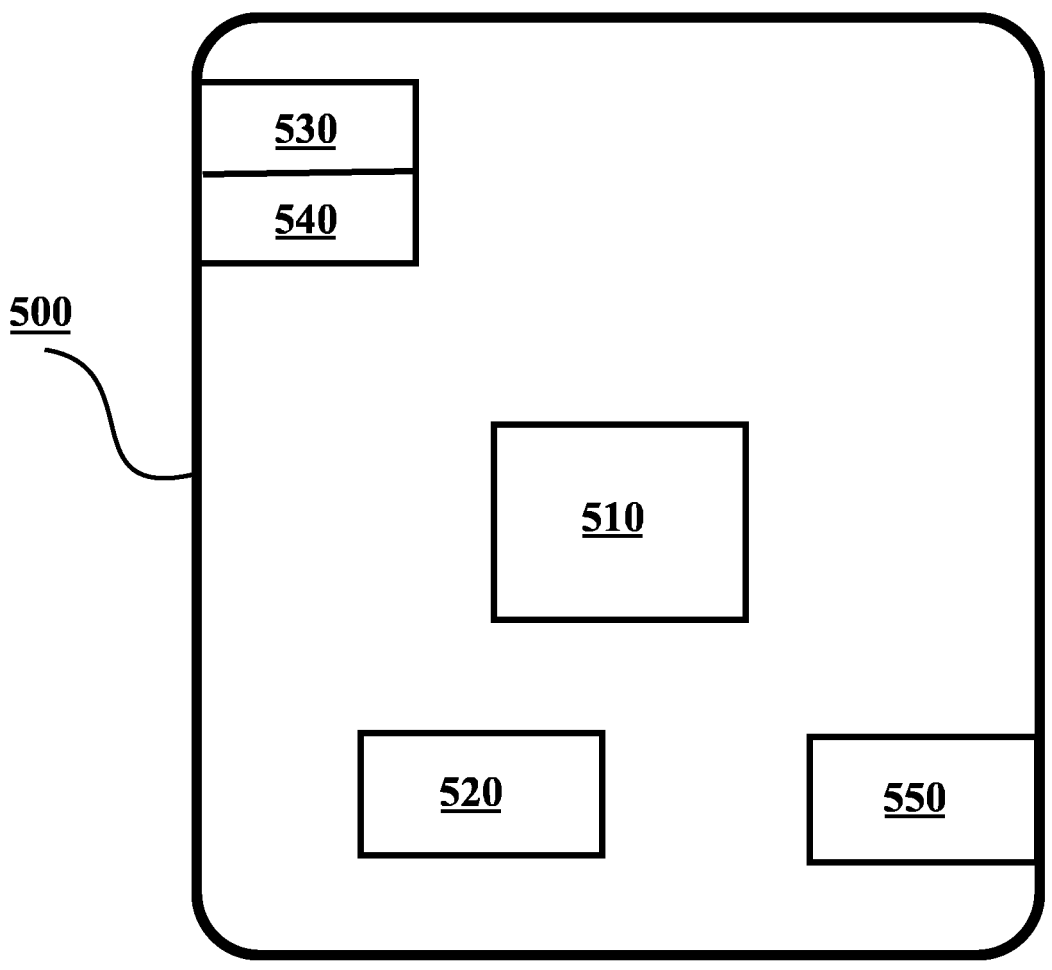
FIG. 5 illustrates an example apparatus capable of supporting at least some example embodiments.

FIG. 5 illustrates an example apparatus capable of supporting at least some example embodiments. Illustrated is device 500, which may comprise, for example, apparatus 132 of FIG. 1, or a device controlling functioning thereof. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. Processor 510 may comprise at least one Application-Specific Integrated Circuit, ASIC. Processor 510 may comprise at least one Field-Programmable Gate Array, FPGA. Processor 510 may comprise an Intel Xeon processor for example. Processor 510 may be means for performing method steps in device 500, such as determining, causing transmitting and causing receiving. Processor 510 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular standard, such as a standard defined by the 3rd Generation Partnership Project, 3GPP. Transmitter 530 may comprise more than one transmitter. Receiver 540 may comprise more than one receiver. Transmitter 530 and/or receiver 540 may be configured to operate in accordance with Global System for Mobile communication, GSM, Wideband Code Division Multiple Access, WCDMA, Long Term Evolution, LTE, and/or 5G standards, for example.

Device 500 may comprise User Interface, UI, 550. UI 550 may comprise at least one of a display, a keyboard, a touchscreen, a vibrator arranged to signal to a user by causing device 500 to vibrate, a speaker or a microphone. A user may be able to operate device 500 via UI 550, for example to configure device 500 and/or functions it runs.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. In some example embodiments, device 500 lacks at least one device described above. For example, device 500 may not have UI 550.

Processor 510, memory 520, transmitter 530, receiver 540 and/or UI 550 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the example embodiment various ways of interconnecting at least two of the aforementioned devices may be selected without departing from the scope of the present disclosure.

FIG. 6 is a flow graph of a method in accordance with at least some embodiments. The method may be for, and/or performed by, an apparatus, like apparatus 132 of FIG. 1, or a device controlling functioning thereof.

The method may comprise, at step 610, receiving input data comprising data points. The method may also comprise, at step 620, applying a conditional variational autoencoder to the received data points to generate features associated with the received data points, wherein said applying the conditional variational autoencoder comprises using a label corresponding to a type of network traffic as a conditional variable of the conditional variational autoencoder. Moreover, the method may comprise, at step 630, applying a classifier to the features to classify the received data points into categories. Finally, the method may comprise, at step 640, performing at least one action based on the categories.

In some example embodiments, said performing the at least one action based on the categories, such as anomalous clusters, may comprise providing data points of at least one of the anomalous clusters to a human operator and/or to an algorithm for further analysis. For instance, said providing the data points of at least one of the anomalous clusters to the human operator may comprise presenting the anomalous clusters and/or the anomalous data points on a Graphical User Interface, GUI. Each data point may correspond to properties of a network packet in received network traffic, and each anomalous cluster comprises unknown network traffic.

Moreover, said further analysis by the algorithm may comprise determining for each anomalous cluster of unknown network traffic, whether said anomalous cluster comprises data points associated with a network attack or not. Said determining may comprises performing for each anomalous cluster of unknown network traffic, determining an attack type for each data point in an anomalous cluster, wherein the attack type is either a type of malicious network traffic or none for benign network traffic, determining a number of data points corresponding to each attack type, determining an attack type with a highest number of data points as a majority attack type and determining that the anomalous cluster is a network attack cluster in response to the majority attack type being of some other type than none.

At least one definition of an attack type may be predefined and stored to the apparatus, wherein determining an attack type for each data point in an anomalous cluster may comprise comparing a data point to the at least one stored definition of an attack type, wherein an attack type other than none may be determined in response to finding a matching comparison between the data point and a definition of an attack type, wherein an attack type of none may be determined in response to not finding a matching comparison between the data point and any of the stored definitions of an attack type and wherein the definition of an attack type may comprise values or values ranges for at least one of the following parameters:

a. source Internet Protocol, IP, address;
    b. destination IP address;
    c. IP packet size;
    d. destination Transmission Control Protocol, TCP, port number;
    e. destination User Datagram Protocol, UDP, port number; or f. inter-packet interval of IP packets received from the same source IP address.

The inter-packet interval may be measured in microseconds as a rolling average over the latest 100 packets received from the same IP address. The parameters in the definition of an attack type may be provided in an executable script, and wherein comparing a data point to the definition of an attack type may be performed by executing the script. The definitions of attack types stored to the apparatus may be periodically updated by adding new attack types, removing attack types and/or changing the parameters of attack types. Determining the number of data points corresponding to each attack type may comprise using a voting algorithm for filtering out attack types of a lower proportion than a threshold value.

Said performing the at least one action based on the anomalous clusters may comprise dropping packets coming from a same source address as packets comprising data points of the anomalous clusters determined as network attack clusters. Said performing the at least one action based on the anomalous clusters may comprise dropping packets having a same size as packets comprising data points of the anomalous clusters determined as network attack clusters.

Figure 7:
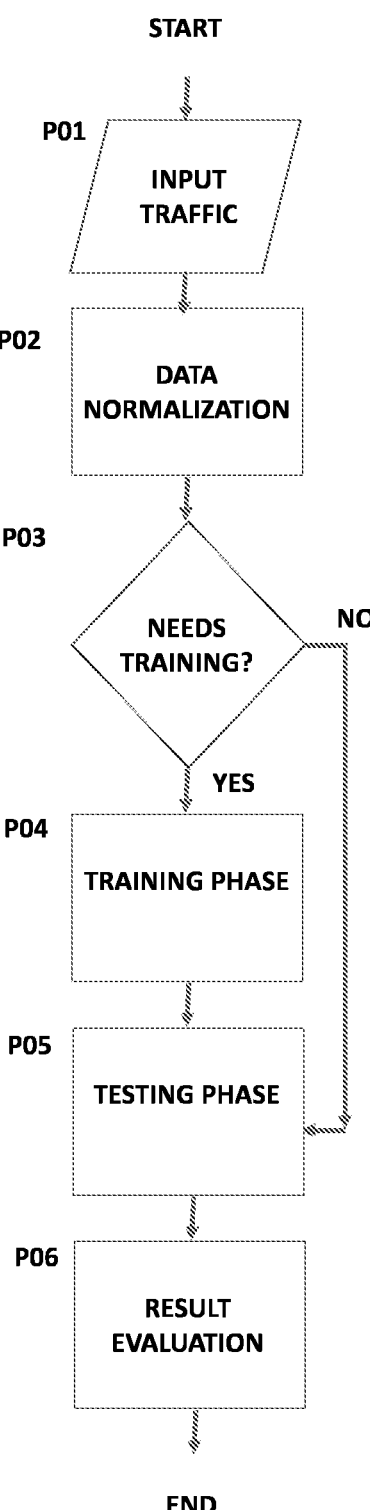
FIG. 7 illustrates a flowchart of a training process of the CVAE and the classifier in accordance with at least some example embodiments.

FIG. 7 illustrates a flowchart of a training process of the CVAE and the classifier in accordance with at least some example embodiments.

In some example embodiments, detected attack packets of network traffic may be fed, possibly automatically, into the CVAE and the classifier for training purposes at process P01 of FIG. 7. The CVAE and the classifier may be trained periodically with new packets after a time threshold, e.g., monthly. The threshold time for training process may be defined based on the computation requirements (e.g., monthly).

In some example embodiments, the CVAE and the classifier may be trained for a mobile network application with one or more publicly available network traffic datasets. Traffic in the datasets may be classified into normal, unknown and attack (n classes of attacks). Packets that do not have any label in the dataset may be presented as unknown.

In some example embodiments, prior to training the CVAE and the classifier, several processes may be done on the mentioned datasets. Data cleaning, converting the columns to the right types, handling missing values, splitting IP addresses into four fields, vectorizing categorical variables, normalizing the dataset, changing the labels of attack categories in order to differentiate different attack categories are carried out in the dataset preprocessing/normalization phase at process P02.

For the normalization, statistical and scaling normalization may be used. In order to improve the performance of the algorithms, numeric attributes may be transformed into nominal attributes. In addition, the IP addresses and hexadecimal Medium Access Control, MAC, addresses of the applied datasets may be transformed into separate numeric attributes. Each numeric attribute may be normalized using batch mean and standard deviation unless there is an already defined range (e.g., IP address range).

After data normalization, a determination may be made at process P03 to determine whether the CVAE and the classifier have previously undergone training by input packets. If no training has been previously done, then training may be needed and the flow chart may proceed to process P04 where the CVAE and the classifier are trained. Likewise, if the CVAE and the classifier have already been trained, but the training took place outside a predefined time window or after a predefined amount of data, then the flow chart may proceed to process P04 where the CVAE and the classifier are retrained to ensure it can handle data properly. The time window and the amount of data may be selected by a user based on the particular application. If it is determined at process P03 that no training is needed, then the flow chart proceeds to process P05 where the CVAE and the classifier are trained using test data. Thereafter, the results of the testing may be evaluated at process P06 to confirm the effectiveness and efficiency of the training from process P04.

In some example embodiments, a publicly available network traffic dataset, such as MAWILab-2018 (http://www.fukuda-lab.org/mawilab/v1.1/) may be applied to training the CVAE and the classifier. The threshold time for training process may be defined based on the computation requirements (e.g., monthly). Furthermore, data cleaning, converting the columns to the right types, handling missing values, splitting IP addresses into four fields, vectorizing categorical variables, normalizing the dataset, changing the labels of attack categories in order to differentiate different attack categories may be carried out in the dataset preprocessing phase. For the normalization, statistical and scaling normalization may be used. In order to improve the performance of the algorithms, numeric attributes are transformed into nominal attributes. In addition, the IP addresses and hexadecimal Medium Access Control, MAC, addresses of the applied datasets may be transformed into separate numeric attributes. Each numeric attribute may be normalized using batch mean and standard deviation unless there is an already defined range (e.g., IP address range).

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an example embodiment, an apparatus, like apparatus 132 of FIG. 1, or a device controlling functioning thereof, may comprise means for carrying out the embodiments described above and any combination thereof.

In an example embodiment, a computer program comprising instructions which, when the program is executed by an apparatus, may cause the apparatus to carry out the first method or the second method. in accordance with the embodiments described above and any combination thereof. In an example embodiment, a computer program product, embodied on a non-transitory computer readable medium, may be configured to control a processor to perform a process comprising the embodiments described above and any combination thereof.

In an example embodiment, an apparatus, like apparatus 132 of FIG. 1, or a device controlling functioning thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in communication networks, for example in cellular communication networks, such as 3GPP networks.

ACRONYMS LIST

3GPP $3^{rd}$ Generation Partnership Project
AI Artificial Intelligence
AUC Area Under Curve
BS Base Station
CVAE Conditional VAE
DBSCAN Density-Based Spatial Clustering of Applications with Noise
DNS Domain Name Server
DoS Denial of Service
GUI Graphical User Interface
IP Internet Protocol
LTE Long Term Evolution MAC Medium Access Control
NR New Radio
OPTICS Ordering Points to Identify the Clustering Structure
PCA Principal Component Analysis
RAT Radio Access Technology
RF Random Forest
ROC Receiver Operator Characteristics
SNN Shared Nearest Neighbor
SVMo Support Vector Machine online
TCP Transmission Control Protocol
TTL Time-To-Live
UDP User Datagram Protocol
UE User Equipment
VAE Variational AutoEncoder
WiMAX Worldwide Interoperability for Microwave Access
WLAN Wireless Local Area Network

REFERENCE SIGNS LIST

| | |
|---|---|
| 110 | User Equipment |
| 115 | Air interface |
| 120 | Base station |
| 125, 135 | Wired interfaces |
| 130 | Core network |
| 132 | Apparatus |
| 140 | Another apparatus |
| 210 | Input data |
| 220 | Feature selection/extraction |
| 230 | SVMo |
| 240 | CVAE |
| 250 | Classifier |
| 260 | Attack categories |
| 270 | Benign category |
| 280 | Clustering analysis method |
| 310 | Encoder |
| 315 | $\mu_\varphi(x)$ |
| 320 | $v_\varphi(x)$ |
| 325 | Sampling |
| 330 | Sampled vector |
| 335 | Label y |
| 340 | Decoder |
| 345 | $v_\theta(\bar{z})$ |
| 350 | $\mu_\theta(\bar{z})$ |
| 355 | Sampling |
| 360 | Output |
| 500-550 | Structure of the apparatus of FIG. 5 |
| 610-640 | Phases of the method in FIG. 6 |

The invention claimed is:

1. An apparatus comprising at least one processor; and at least one memory including computer program code; the at least one memory and the computer program code configured to, with the at least one processor, cause the apparatus at least to:

receive input data comprising data points;

apply a conditional variational autoencoder to the received data points to generate features associated with the received data points, wherein said applying the conditional variational autoencoder comprises using a label corresponding to a type of network traffic as a conditional input variable of the conditional variational autoencoder;

apply a classifier to the features to classify the received data points into categories; and perform at least one action based on the categories;

wherein an encoder of the conditional variational autoencoder is used after training and a decoder of the conditional variational autoencoder is used during training of the conditional variational autoencoder and the classifier.

2. The apparatus according to claim 1, wherein the categories comprise normal, unknown and at least one attack category.

3. The apparatus according to claim 1, wherein the apparatus is further configured to:

train the conditional variational autoencoder with unlabelled data.

4. The apparatus according to claim 1, wherein the apparatus is further configured to:

train the classifier with labelled data.

5. The apparatus according to claim 1, wherein the classifier is a random forest classifier.

6. The apparatus according to claim 1, wherein the apparatus is further configured to:

apply an output of the classifier to a clustering analysis method.

7. The apparatus according to claim 6, wherein the clustering analysis method is Density-Based Spatial Clustering of Applications with Noise, DBSCAN, method.

8. The apparatus according to claim 1, wherein the apparatus is further configured to:

operate as an intrusion detection system.

9. A method, comprising:

receiving input data comprising data points;

applying a conditional variational autoencoder to the received data points to generate features associated with the received data points, wherein said applying the conditional variational autoencoder comprises using a label corresponding to a type of network traffic as a conditional input variable of the conditional variational autoencoder;

applying a classifier to the features to classify the received data points into categories; and performing at least one action based on the categories;

wherein an encoder of the conditional variational autoencoder is used after training and a decoder of the conditional variational autoencoder is used during training of the conditional variational autoencoder and the classifier.

10. The method according to claim 9, wherein the categories comprise normal, unknown and at least one attack category.

11. The method according to claim 9, wherein the method further comprises:

training the conditional variational autoencoder with unlabelled data.

12. The method according to claim 9, wherein the method further comprises:

training the classifier with labelled data.

13. The method according to claim 9, wherein an encoder of the conditional variational autoencoder is used after training and a decoder of the conditional variational autoencoder is used during training of the conditional variational autoencoder and the classifier.

14. The method according to claim 9, wherein the classifier is a random forest classifier.

15. The method according to claim 9, wherein the method further comprises:

applying an output of the classifier to a clustering analysis method.

16. The method according to claim 15, wherein the clustering analysis method is Density-Based Spatial Clustering of Applications with Noise, DBSCAN, method.

17. The method according to claim 9, wherein the method further comprises:

operating as an intrusion detection system.

18. A non-transitory computer readable medium having stored thereon a set of computer readable instructions that, when executed by at least one processor, cause an apparatus to at least perform:

receiving input data comprising data points;

applying a conditional variational autoencoder to the received data points to generate features associated with the received data points, wherein said applying the conditional variational autoencoder comprises using a label corresponding to a type of network traffic as a conditional input variable of the conditional variational autoencoder;

applying a classifier to the features to classify the received data points into categories; and performing at least one action based on the categories;

wherein an encoder of the conditional variational autoencoder is used after training and a decoder of the conditional variational autoencoder is used during training of the conditional variational autoencoder and the classifier.

19. The apparatus according to claim 18, wherein the categories comprise normal, unknown and at least one attack category.

* * * * *